UNITED STATES PATENT OFFICE.

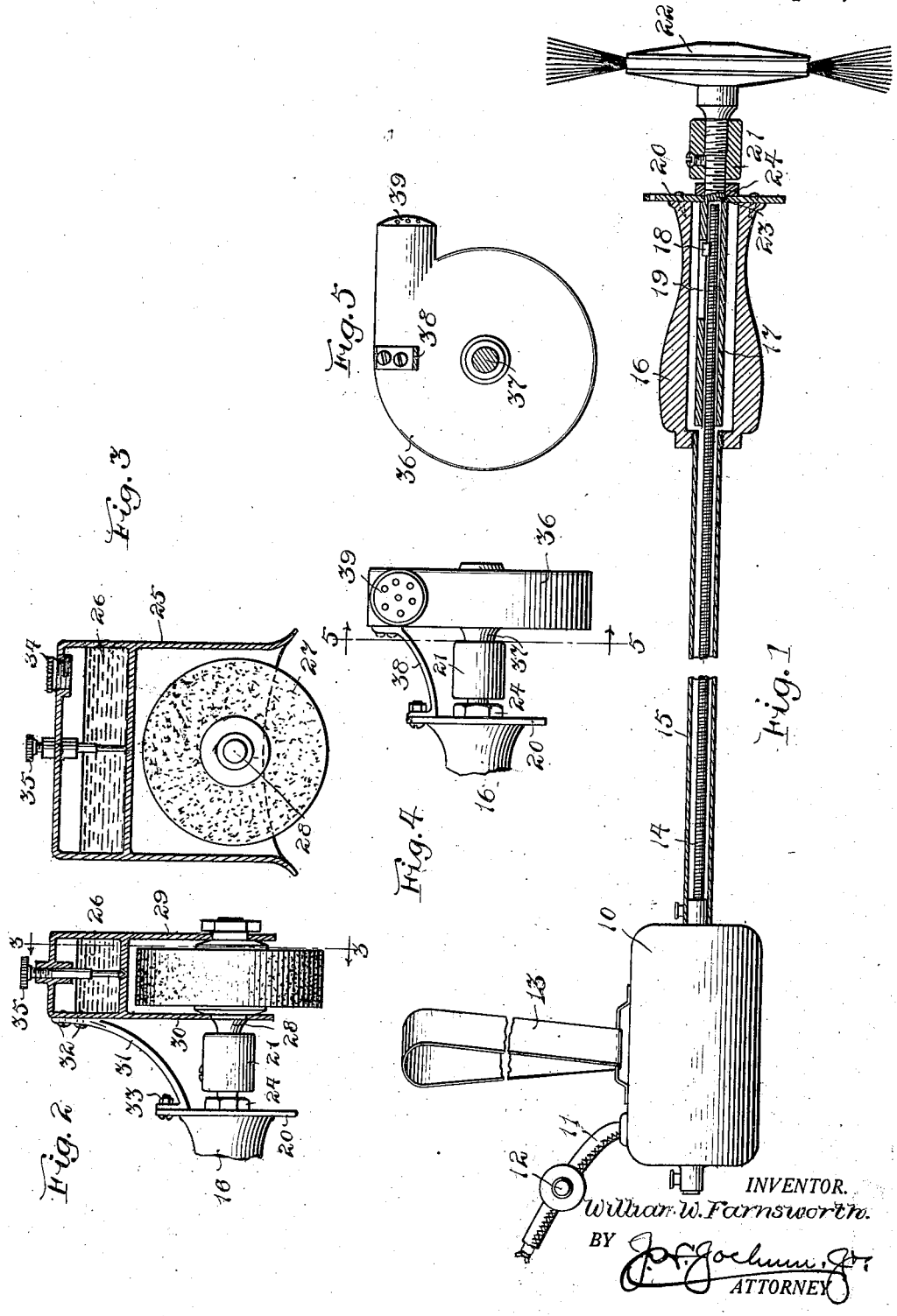

WILLIAM W. FARNSWORTH, OF LITTLETON, COLORADO.

PORTABLE VEHICLE CLEANER AND WASHER.

1,262,316.   Specification of Letters Patent.   Patented Apr. 9, 1918.

Application filed February 7, 1917. Serial No. 147,075.

*To all whom it may concern:*

Be it known that I, WILLIAM W. FARNSWORTH, a citizen of the United States, residing at Littleton, in the county of Arapahoe and State of Colorado, have invented certain new and useful Improvements in Portable Vehicle Cleaners and Washers, of which the following is a specification.

This invention relates to improvements in electric vehicle cleaners and washers of the portable type embodying a motor adapted to be carried by the operator, and a flexible shaft connected with the motor and to which shaft a cleaning implement is connected to be actuated thereby, and which implement may be detached therefrom and another form of implement or cleaning device substituted therefor.

A further object is to provide an improved powerful compact device of this character, which will be simple, durable and comparatively light and cheap in construction and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating the invention, and in which:

Figure 1 is a view partly in elevation and partly in longitudinal section of an improved device of this character constructed in accordance with the principles of this invention.

Fig. 2 is a view partly in elevation and partly in vertical section of one form of implement adapted to be attached to the operating shaft.

Fig. 3 is a view taken on line 3—3, Fig. 2.

Fig. 4 is an end elevation of another form of implement.

Fig. 5 is a view as taken on line 5—5, Fig. 4.

Referring more particularly to the drawing, the numeral 10 designates a motor of the electric type and of any desired size and power, receiving its energy from a suitable source of power through a conductor 11 and is controlled by a switch 12.

Connected with the casing of the motor 10 is a strap or support 13 which is adapted to be passed over the shoulder of the operator so that the motor may be carried by the operator. A flexible shaft 14 is connected with the motor and may be of any desired length. Surrounding the shaft 14 and having one end connected with the motor casing, is a flexible casing 15, the other end of which is connected in any suitable manner to the handle 16 so that the handle will form a portion of the casing. The handle 16 is hollow and the end of the flexible shaft 14 projects into the handle from one end thereof. A tubular element 17 is connected with the handle 16 in any suitable manner so as to hold the element and handle against relative longitudinal adjustment. The end of the shaft 14 telescopes into the body of the tubular element 17 within the handle 16, and is provided with a pin 18 which operates in a slot 19 in the element 17, so that when the shaft 14 is bent or deflected by the adjustment of the handle, the shaft 14 and element 17 will have a slight longitudinal movement with respect to each other to prevent binding of the parts. The end of the element 17 projects beyond the end 20 of the handle, and is provided exterior of the handle with a coupling member 21 and by means of which coupling the implement 22 may be detachably secured to the member 17.

The end 20 of the handle is preferably in the form of a plate or flange secured to the handle, and the element 17 is fixed against longitudinal movement with respect to the handle in any suitable manner, preferably by means of a shoulder 23 on the element 17 which abuts one face of the plate 20, and a nut 24 which engages a threaded portion of the element on the opposite side of the plate.

It will thus be manifest that when the motor is operating, the shaft 14 will be rotated and by applying the implement 22 to the surface to be cleaned, the dirt will be removed therefrom.

When the implement 22 is deflected, the shaft 14 and casing 15 will be bent or deflected and the pin and slot connection 18, 19 will permit the implement to be deflected without binding the shaft.

In Figs. 2 and 3 there is shown another form of implement adapted to be interchanged with the implement 22 and comprising a casing 25 having a tank 26 adapted to supply liquid to a polishing wheel 27, that is rotatably mounted by means of the axle 28 in the walls 29, 30 of the casing. The end of the axle 28 is adapted to be secured to the coupling member 21, and in order to support the weight of the casing, a supporting bracket 31 may be provided which is secured to the casing 26 as at 32 and also to the flange 20 as at 33. The tank 26 is supplied with liquid through an opening having a closure 34 and a valve 35 may be provided for regulating the flow of liquid to the element 27, and which latter may be constructed of any suitable material such as felt or the like.

In Figs. 4 and 5 another form of implement is shown and consists of a casing 36 for receiving a fan, the axle 37 of which fan is secured to the coupling member 21 and the casing is supported by a bracket 38, similar to the bracket 31. The casing is also provided with an opening 39 through which the air currents may act upon the surface to be cleaned.

With this improved construction it will be manifest that any form of cleaning implement may be attached to the shaft and that when so attached the implement may be so directed at the will of the operator as to facilitate the cleaning operation.

It will also be manifest that the parts will be compactly arranged and will be of a comparatively light but powerful structure, easily manipulated and the implement may be directed to any portion of the surface to be cleaned.

While the preferred form of construction has been herein shown and described it is to be understood that many changes may be made in the details of construction thereof, within the scope of the claims, without departing from the spirit of this invention.

What is claimed as new is:

1. A portable device of the character described embodying a flexible tubular casing, a hollow handle connected with one end of the casing and forming a continuation thereof, a tubular element rotatably supported by the handle, one end of the said element extending into the handle from one end thereof toward and terminating short of that end of the casing to which the handle is secured, said tubular element alining with the casing, a flexible driven shaft in the casing, the end of the shaft extending into the handle and telescoping with the said element, and means connecting the shaft and said element for rotation but permitting relative longitudinal adjustment.

2. A portable device of the character described embodying a flexible tubular casing, a hollow handle connected with one end of the casing and forming a continuation thereof, a tubular element rotatably supported by the handle, one end of the said element extending into the handle from one end thereof toward and terminating short of that end of the casing to which the handle is secured, said tubular element alining with the casing, a flexible driven shaft in the casing, the end of the shaft extending into the handle and telescoping with the said element, and a pin and slot connection between the shaft and element and within the handle.

In testimony whereof I have signed my name to this specification, in the presence of two subscribing witnesses, on this 31 day of January, A. D. 1917.

WILLIAM W. FARNSWORTH.

Witnesses:
LELAND DAILEY,
M. L. LEFFINGWELL.

Copies of this patent may be obtained for five cents each, by addressing the "Commissioner of Patents, Washington, D. C."